March 21, 1967 P. HAWTIN 3,310,285
DENTAL HANDPIECE

Filed Feb. 2, 1966 3 Sheets-Sheet 1

INVENTOR
PERCY HAWTIN

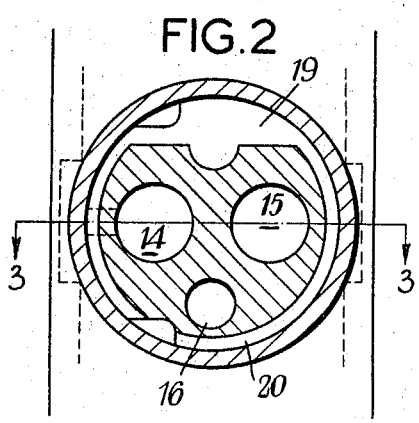
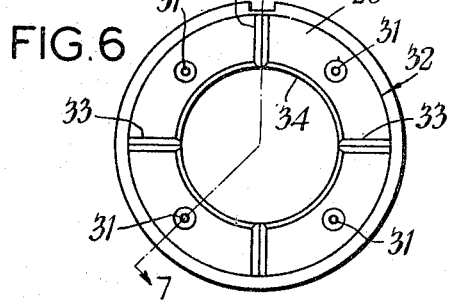
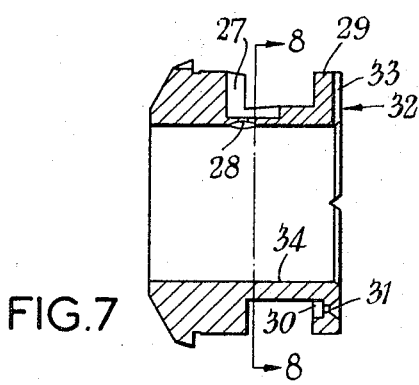
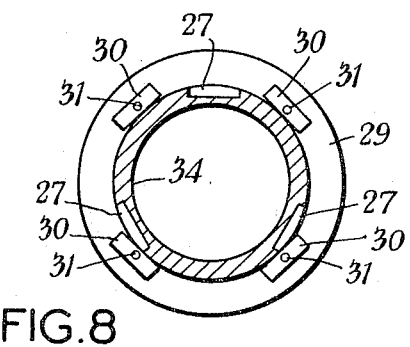

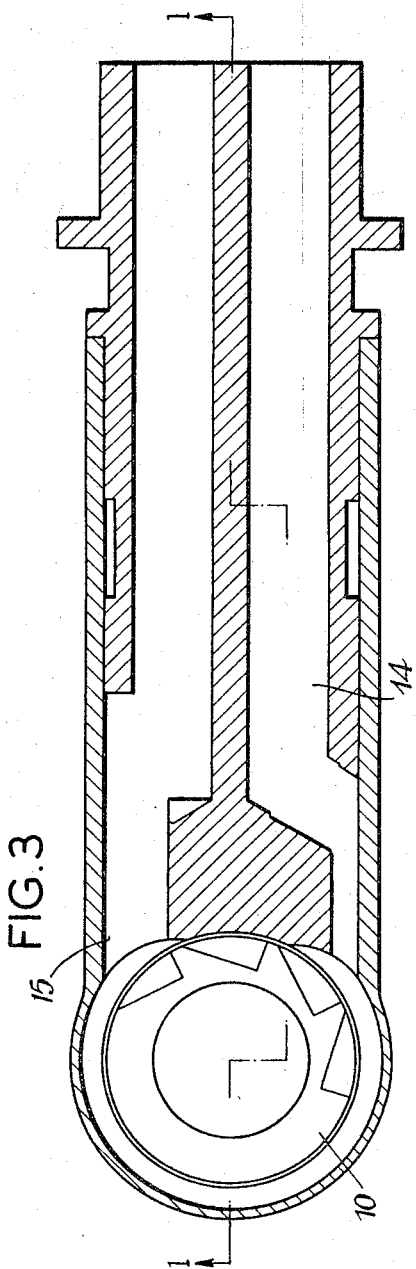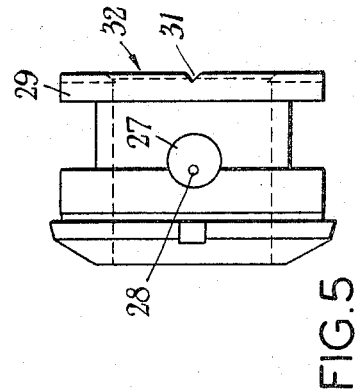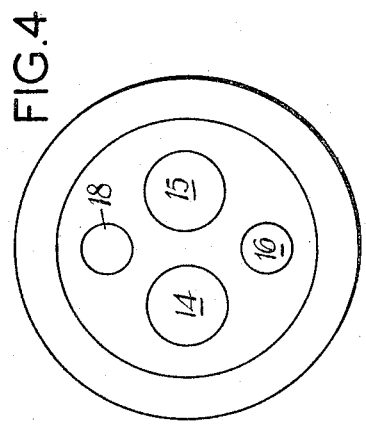
INVENTOR
PERCY HAWTIN

United States Patent Office 3,310,285
Patented Mar. 21, 1967

3,310,285
DENTAL HANDPIECE
Percy Hawtin, Preston New Road,
Blackpool, England
Filed Feb. 2, 1966, Ser. No. 533,746
Claims priority, application Great Britain, Nov. 15, 1962,
43,324/62
3 Claims. (Cl. 253—2)

This application is a continuation-in-part of my pending application Ser. No. 290,807, filed June 26, 1963, now abandoned.

This invention relates to dental apparatus and is more particularly concerned with turbine driven dental handpieces.

A significant feature of turbine-driven dental handpieces is the very high speed at which they can operate, and it is a common practice to design such handpieces to drive a dental drill at a rate of 250,000 r.p.m. to 600,000 r.p.m. Heretofore, it has been a common practice to support the rotor of the turbine by means of ball race bearings which gives rise to the generation of terrific noise. Not only is this noise terrifying to many patients, but also there is evidence that continued exposure to the noise by a dentist causes increasing deafness. Moreover, vibrations created by metal-to-metal contact prevented the production of a fine surface finish.

It is a primary object of this invention to provide an improved method of and means for supporting the rotor of a turbine-driven dental handpiece whereby the undesirable noise referred to above will be obviated and the useful life of the turbine casing will be prolonged.

The construction of the turbine and bearing sleeves are such that hybrid air bearing is created. If two surfaces are closely mated, such as when a shaft is accurately fitted within a sleeve bearing with just sufficient size difference to allow the shaft to rotate, and if the shaft is rotated at a high speed, aerodynamic pressures develop between the shaft and the sleeve bearing wall in a manner similar to the lift which is produced by an aircraft wing. If drillings are made through the sleeve wall and air is injected, the aerodynamic lift produced by the rotating shaft is greatly multiplied due to the addition of aerostatic pressure. Thus, the aerodynamic/aerostatic bearing system is known as a hybrid bearing system. The same aerodynamic pressure effect or bearing can be produced where two flat surfaces are closely mated together and one is rotated at a high speed. When accompanied by aerostatic pressure, the bearing is again identified as a hybrid bearing.

When side or end thrust are delivered to the turbine as a dentist drills a hole in a human tooth, the turbine is apt to come in contact with the bearing walls which not only creates objectionable noise but also increases the possibility of turbine seizure over a period of time. By commingling oil or other liquid with air within the bearing spaces, it has been found that oil and air will separate into two zones, the fluid of heavier density (oil) being collected in a zone contiguous with the stationary wall of the bearing and the fluid of lighter density (air) being collected contiguous with the rotating part. Thus, the advantage of having an air bearing rather than a liquid bearing, which causes a drag on the turbine at high speeds, is maintained. The outer zone comprising a film of oil will carry excessive loads after the initial air film has given way and will provide a cushion sufficiently strong to withstand normal excessive side and end thrust which a dentist might use in drlling a hole in a human tooth.

In order that the invention may be clearly understood and readily carried into effect the same will be hereinafter more fully described with reference to the accompanying drawings in which:

FIGURE 2 is a section on the line 2—2 of FIGURE 1;

FIGURE 3 is a section on the line 3—3 of FIGURE 2;

FIGURE 4 is an end view looking from the right of FIGURE 1,

FIGURE 5 is a side elevational view of a bearing element employed in the head shown in FIGURES 1–4, FIGURE 6 is an end elevational view of the element looking from the right of FIGURE 5, FIGURE 7 is a sectional view on the line 7—7 of FIGURE 6, FIGURE 8 is a sectional view on the line 8—8 of FIGURE 7.

Figure 1:
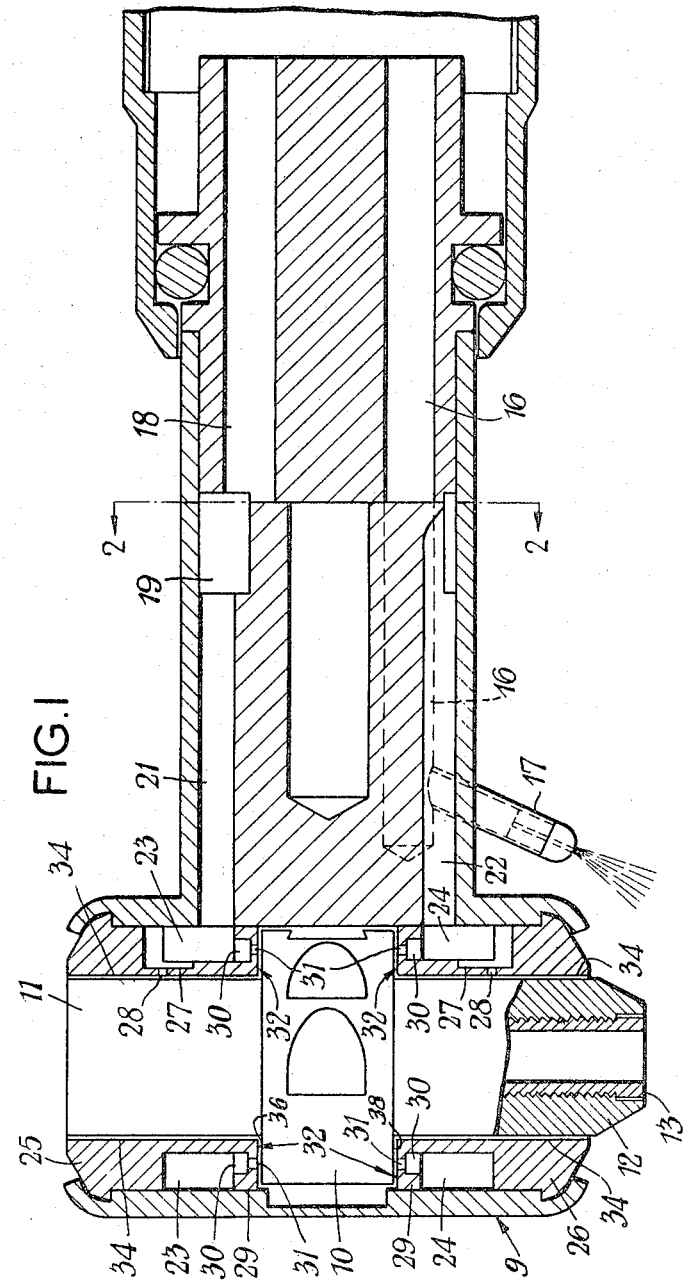
FIGURE 1 is a sectional view of a detachable turbine head for application to a dental handpiece, the section being taken on the line 1—1 of FIGURE 3.

Referring now to the drawings and more particularly to FIGURES 1–4, there is shown a T-shaped casing 9 containing a turbine rotor 10 in the head thereof which is provided with upper and lower exteriorly continuously smooth uninterrupted spindle portions 11 and 12, the latter incorporating a chuck 13 adapted to receive and hold a drill or bur not shown. The turbine rotor, which is supported for free rotation in a manner hereinafter more fully described, is adapted to be driven through the medium of air under pressure supplied through an axially directed passage 14 in the casing 9, air being exhausted from the rotor and being discharged through a second axially directed passage 15 (FIGURE 2). The casing 9 also contains a passage 16 through which water may be delivered, when required, to a jet or nozzle 17 directed towards any drill or bur mounted in the chuck 13. The rotor is also provided with a pair of longitudinally disposed exteriorly continuously smooth uninterrupted radial bearing surfaces 36 and 38 extending radially outwardly from the base of the spindles 11 and 12. Further description of the turbine is not considered necessary, it being apparent that the means which enables it to be driven and its mode of operation are standard and well-known.

As will be seen from FIGURES 1, 2 and 4 the casing is provided with a further axially directed passage 18 through which air under pressure will also be supplied, such air preferably having present therein a quantity of oil or other liquid in the form of a mist or spray. The delivery of oil to the air stream may be effected in the manner described in British Patent 875,576 or alternatively any other means may be adopted for producing an oil laden air stream. The passage 18 communicates with a chamber 19 which in turn communicates with an annular passage 20. Communicating with the chamber 19 and with the annular passage 20 are further axially directed passages 21, 22 via which the oil laden air is delivered to annular recesses 23, 24 present in the upper and lower bearing elements 25 and 26. The elements 25 and 26 are secured in place within the head of the T-shaped turbine casing. The bearing elements 25 and 26 are of identical construction and one is illustrated in greater detail in FIGURES 5–8 to which reference will now be made.

As will be seen each bearing element is preferably provided with three equally spaced counter bores 27 each having a small aperture or orifice 28 communicating with the internal cylindrical bore or bearing surface 34 of the element. The internal bearing surfaces 34 are smooth and uninterrupted except for orifices 28. Each surface is substantially impermeable to air and liquid and defines a smooth longitudinal bore in which a spindle of the rotor is received so that the exteriorly smooth surface of the spindle is spacedly juxtaposed to the corresponding internal bearing surface 34. The radial clearance between the spindle and adjacent bearing surface 34 (i.e., gap across annular spindle bearing space) is preferably of the order of .00042 to .00045 inch. It will be seen that the oil-laden air enters recess 23 (24) and is delivered via apertures 28 at three equally spaced points to the spindle bearing spaces.

As will be further seen from FIGURES 5–7 each bearing element 25 (26) terminates at its inner end in a flange or end portion 29 which internally defines one end boundary of the recess 23 (24) and externally defines a radial bearing surface 32. The radial bearing surfaces of the upper and lower bearing elements are longitudinally disposed from each other and define a rotor-receiving chamber therebetween. There are preferably four equally spaced grooves 30, each having a small aperture or orifice 31, communicating the recess 23 (24) with the radial bearing surface 32 and rotor-receiving chamber. The rotor is received within the chamber defined by the radial bearing surfaces 32 so that the radial surfaces 36 and 38 of the rotor are spacedly juxtaposed to the corresponding radial bearing surface 32 and define therebetween a radial bearing space. The clearance between each radial bearing surface 36 (38) of the rotor and the adjacent radial surface 32 of the bearing element (i.e., gap across rotor bearing space) is preferably of the order of .0020 to .0025 inch.

As will be further seen, the radial bearing surface 32 of each bearing element is preferably provided with four equally spaced and radially directed grooves 33 of V-shaped cross-section which facilitate passage of air from the bearing such escaping air eventually passing out of the casing head via exhaust passage 15. The grooves 32 preferably have a maximum width of approximately .012 to .016 inch.

From the foregoing it will be seen that preferably oil-laden air under pressure will be supplied to the spaces or clearances present (a) between the rotor radial bearing surfaces 36 and 38 and the adjacent radial bearing surfaces 32 of the bearing elements 25, 26 and (b) between the spindle portions 11 and 12 of the rotor and the cylindrical or internal bearing surfaces 34 of the bearing elements 25, 26. As previously explained, this dental handpiece incorporates both aerodynamic and aerostatic bearing forces. With bearing clearances of the order hereinbefore indicated, it has been found that the optimum in pressure for maximum efficiency will be approximately 60 p.s.i., but the bearings will operate, albeit with reduced efficiency, with a pressure of approximately 35 p.s.i. At speeds under approximately 250,000 r.p.m. the primary bearing force is the aero-static force. The air being injected into the bearing spaces under pressure preferably has been injected with small quantities of oil. When the turbine is rotated at speeds between 250,000 r.p.m. and 600,000 r.p.m., the aero-dynamic force comes into operation and the oil is separated from the air. Because of the relative densities of the oil and air, the fluid of heavier density (oil) is forced into a zone contiguous with the stationary bearing surfaces 34 and 32. Accordingly, a layer or zone of lighter density fluid (air) collects contiguous with the rotating surfaces of the spindle and rotor. Thus, for instance, two annular concentric zones, one of air and the other of oil, are formed around each spindle. It is estimated that the thickness of the outer oil film is approximately .0001 inch. These zones can be established because the bearing surfaces of the bearing elements and rotating elements are smooth and uninterrupted except for the apertures extending through the bearing surfaces of the bearing element and the radial grooves in the radial bearing surface 32. These grooves do not prevent aerodynamic forces from being developed in the rotor bearing gap inasmuch as they are machined in the stationary element and are formed in a line at right angles to the direction of rotation of the rotor. These grooves merely allow the bearing to operate as four complete thrust sections.

When the aerodynamic force comes into operation and forms a cushion of oil on the surface of the bearing element, this cushion or layer of oil is separated from the shaft by an air zone. Accordingly, the rotating turbine continues to run on a conventional air bearing and does not come into contact with the layer of oil. When excessive lateral or longitudinal pressure is applied to the drill, the layer of air breaks down and the spindles or rotor are forced towards the sides of the bearing and into contact with the cushion of oil. Under normal applications of excessive pressure, the cushion of oil prevents metal-to-metal contact between the rotating turbine and the bearing elements. Consequently, undesirable noise and vibrations are eliminated while allowing continued high speed rotation.

While the oil has been described as being injected into the air stream prior to entering the bearing spaces, it should be appreciated that oil could be injected directly into the bearings in vapor form. Furthermore, it is also within the scope of the invention to pour liquid oil into the bearing before air pressure is applied. The surplus oil is then forced out of the ends of the bearing leaving a clear passage for compressed air to operate the bearings in the normal manner. It will also be appreciated that the oil will remain in the bearings for an extended period of time and does not require replacing, for the purpose of the oil is only to provide a cushion rather than to provide extended lubrication.

While a preferred form of the invention has been illustrated in the drawings and discussed above, it should be adequately clear that considerable modification may be made thereto without departing from the principles of the invention. Therefore, the foregoing should be considered in an illustrative sense rather than a limiting sense, and accordingly the extent of this invention should be limited only by the spirit and cope of the claims appended hereto.

I claim:
1. A turbine-driven dental handpiece comprising:
a T-shaped casing, the head thereof being hollow;
upper and lower bearing elements secured in the head of the casing at the longitudinally disposed ends thereof, each bearing element having a smooth internal bearing surface defining a longitudinal bore, each bearing element being substantially impermeable to air and liquid and having a plurality of orifices through which air is supplied to the bore, each bearing element terminating at its inner end in a smooth radial bearing surface, the radial bearing surfaces of the upper and lower bearing elements being longitudinally disposed from each other and defining a rotor-receiving chamber therebetween, each radial bearing surface having a plurality of orifices through which air is supplied to the rotor-receiving chamber and a plurality of equally spaced radial grooves to facilitate passage of air to the rotor-receiving chamber;
a rotor having a pair of longitudinally disposed exteriorly continuously smooth uninterrupted radial bearing surfaces disposed within the rotor-receiving chamber with the radial bearing surfaces being spacedly juxtaposed to the corresponding radial bearing surfaces of the bearing elements and defining therewith rotor bearing spaces, the rotor having upper and lower exteriorly continuously smooth uninterrupted cylindrical spindles axially secured thereto, the exteriorly smooth surface of the spindles being spacedly juxtaposed to the corresponding interior surface of the bore and defining therewith spindle bearing spaces, the gap across each rotor bearing space being approximately .0020 to .0025 inch and the gap across each spindle bearing space being approximately .00042 to .00045 inch;
means for rotatably driving the rotor about its axis;
means for supplying air to the rotor bearing spaces and to the spindle bearing spaces; and
means for commingling a liquid with the air, whereby the rapid rotation of the rotor and spindles causes the commingled liquid and air to substantially separate into two zones of fluid, an outer zone of liquid being collected adjacent the upper and lower bearing elements and an inner zone of air being collected adjacent the rotating rotor and spindles.

2. In a high speed turbine of the type having spindles with annular smooth peripheral bearing surfaces and a rotor with smooth bearing surfaces, both received in smooth-surfaced stationary bearing elements, wherein the rotor and axial spindles secured thereto are supported on an air bearing provided by an imput of pressurized air in the bearing spaces between the juxtaposed bearing surfaces of the turbine rotor and spindles and the stationary bearing elements, the improved method of supporting the rotor and axial spindles so as to prevent contact with the adjacent surface of the bearing elements under normal usage comprising:

directing air into the bearing spaces and against the smooth bearing surfaces of the rotor and spindles;
commingling the air with a liquid within the bearing spaces; and
directing the air against the rotor so as to rapidly rotate the rotor and spindles whereby the air and liquid are substantially separated into two zones of fluid, an outer zone of liquid being collected adjacent the stationary bearing element and an inner zone of air being collected adjacent the rotating rotor and spindles.

3. In a high speed turbine of the type having spindles with annular smooth peripheral bearing surfaces and a rotor with smooth bearing surfaces, both received in smooth-surfaced stationary bearing elements, wherein the rotor and axial spindles secured thereto are supported on an air bearing provided by an imput of pressurized air in the bearing spaces between the juxtaposed bearing surfaces of the turbine rotor and spindles and the stationary bearing elements, the improved method of supporting the rotor and axial spindles so as to prevent contact with the adjacent surface of the bearing elements under normal usage comprising:

commingling air with a liquid;
directing the resultant commingled mixture of air and liquid into the bearing spaces and against the smooth bearing surfaces of the rotor and spindles; and
directing air against the rotor so as to rapidly rotate the rotor and spindle whereby the air and liquid are substantially separated into two zones of fluid, an outer zone of liquid being collected adjacent the stationary bearing element and an inner zone of air being collected adjacent the rotating rotor and spindles.

References Cited by the Examiner

UNITED STATES PATENTS

| 2,442,202 | 5/1948 | Hughes-Caley. | |
|---|---|---|---|
| 2,671,700 | 3/1954 | Seyffert. | |
| 3,147,551 | 9/1964 | Seegers | 253—3 |

FOREIGN PATENTS 875,576  8/1961  Great Britain.

MARTIN P. SCHWADRON, *Primary Examiner.*

EVERETT A. POWELL, Jr., *Examiner.*